United States Patent
Matsumoto et al.

(10) Patent No.: US 12,264,989 B2
(45) Date of Patent: Apr. 1, 2025

(54) WHEEL TEST DEVICE WITH RAIL WHEEL TO CONTACT TEST WHEEL WHILE TEST WHEEL IS ROTATABLY SUPPORTED

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuhiro Murauchi, Tokyo (JP); Shuichi Tokita, Kanagawa (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 273 days.

(21) Appl. No.: 18/048,319

(22) Filed: Oct. 20, 2022

(65) Prior Publication Data
US 2023/0054417 A1     Feb. 23, 2023

Related U.S. Application Data

(63) Continuation-in-part of application No. PCT/JP2021/017337, filed on May 6, 2021.

(30) Foreign Application Priority Data

May 8, 2020 (JP) ................. 2020-082297

(51) Int. Cl.
*G01M 17/10*     (2006.01)
(52) U.S. Cl.
CPC .................. *G01M 17/10* (2013.01)
(58) Field of Classification Search
CPC ...................................................... G01M 17/10
See application file for complete search history.

(56) References Cited

U.S. PATENT DOCUMENTS 3,812,708 A * 5/1974 Cowan ............... G01B 17/06
                                                    73/598
4,719,793 A * 1/1988 Pozo ..................... G01N 3/42
                                                    73/81

(Continued)

FOREIGN PATENT DOCUMENTS

CN      205079949 U     3/2016
CN      106124208 A     11/2016
(Continued)

OTHER PUBLICATIONS

Jul. 6, 2021 International Search Report issued in International Patent Application No. PCT/JP2021/017337.

*Primary Examiner* — Eric S. McCall
(74) *Attorney, Agent, or Firm* — Oliff PLC

(57) ABSTRACT

A wheel test device includes a rail wheel support rotatably supporting a rail wheel, a wheel support rotatably supporting a test wheel in contact with the rail wheel, a first electric motor, a power distributor distributing power generated by the first electric motor to the rail wheel and the test wheel, and a torque generator generating torque to be applied to the test wheel. The torque generator includes a rotating frame rotationally driven by the first electric motor, and a second electric motor mounted on the rotating frame. One of or both the rail wheel and the test wheel is connected to the first electric motor via the torque generator. A rated output of the second electric motor is equal to or more than 3 kW, and moment of inertia of a rotating part of the second electric motor is equal to or less than 0.01 kg·m².

11 Claims, 9 Drawing Sheets

(56) References Cited

U.S. PATENT DOCUMENTS

| | | | | |
|---|---|---|---|---|
| 4,800,748 A * | 1/1989 | Fischer | ................ | G01M 17/10 |
| | | | | 73/146 |
| 6,234,011 B1 * | 5/2001 | Yamagishi | ........ | G01M 17/0072 |
| | | | | 73/11.06 |
| 9,752,993 B1 * | 9/2017 | Thompson | .......... | G01M 5/0066 |
| 2017/0059452 A1 * | 3/2017 | Fischer | ................ | G01M 17/10 |
| 2024/0241015 A1 * | 7/2024 | Matsumoto | ........... | G01M 17/10 |

FOREIGN PATENT DOCUMENTS

| | | | |
|---|---|---|---|
| JP | 2001-141616 A | 5/2001 | |
| JP | 2006-184068 A | 7/2006 | |
| JP | 2007-271447 A | 10/2007 | |
| JP | 2014-016201 A | 1/2014 | |
| WO | 2014/058051 A1 | 4/2014 | |

* cited by examiner

WHEEL TEST DEVICE WITH RAIL WHEEL TO CONTACT TEST WHEEL WHILE TEST WHEEL IS ROTATABLY SUPPORTED

CROSS REFERENCE TO RELATED APPLICATIONS

This is a Continuation-in-Part of International Application No. PCT/JP2021/017337 filed on May 6, 2021, which claims priority from Japanese Patent Application No. 2020-082297 filed on May 8, 2020. The entire disclosures of the prior applications are incorporated herein by reference.

BACKGROUND

Technical Field

Aspects of the present disclosure relate to a wheel test device.

Related Art

There is known a test device for simulating and examining an interaction between a rail and a wheel during when a railway vehicle is running. For example, there is known a test device capable of performing a test simulating a running state of a railway vehicle by rotating both a rail wheel which is a disk-shaped member having a cross-sectional shape simulating a rail at an outer peripheral portion thereof and a wheel in a state where the wheel is pressed against the rail wheel.

SUMMARY

Since the conventional test device mentioned above is driven by a single electric motor, when performing a test for applying a large torque to the wheel while rotating the wheel at a high speed, it is necessary to use a large-capacity electric motor, and thus there is a problem that power consumption during the test becomes enormous.

At least one aspects of the present disclosure are advantageous to provide a technique to reduce power consumption of a wheel test device.

According to aspects of the present disclosure, there is provided a wheel test device including a rail wheel support configured to rotatably support a rail wheel, a wheel support configured to rotatably support a test wheel in a state where the test wheel is in contact with the rail wheel, a first electric motor configured to rotate the rail wheel and the test wheel, a power distributor configured to distribute power generated by the first electric motor to the rail wheel and the test wheel, and a torque generator configured to generate torque to be applied to the test wheel. The torque generator includes a rotating frame rotationally driven by the first electric motor, and a second electric motor mounted on the rotating frame. The rail wheel, the test wheel, or both the rail wheel and the test wheel is connected to the first electric motor via the torque generator. The rail wheel and the test wheel are configured to rotate in opposite directions at substantially the same peripheral speed when the operation of the second electric motor is stopped. A rated output of the second electric motor is equal to or more than 3 kW, and moment of inertia of a rotating part of the second electric motor is equal to or less than 0.01 kg·m$^2$.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the drawings. In the following description, the same or corresponding elements will be denoted by the same or corresponding numerals, and redundant description will be omitted. In each drawing, in a case where a plurality of item whose numerals are in common are shown, the numeral is not necessarily assigned to all of the plurality of items, and assignment of the numeral to some of the plurality of item is appropriately omitted.

First Embodiment

Figure 1:
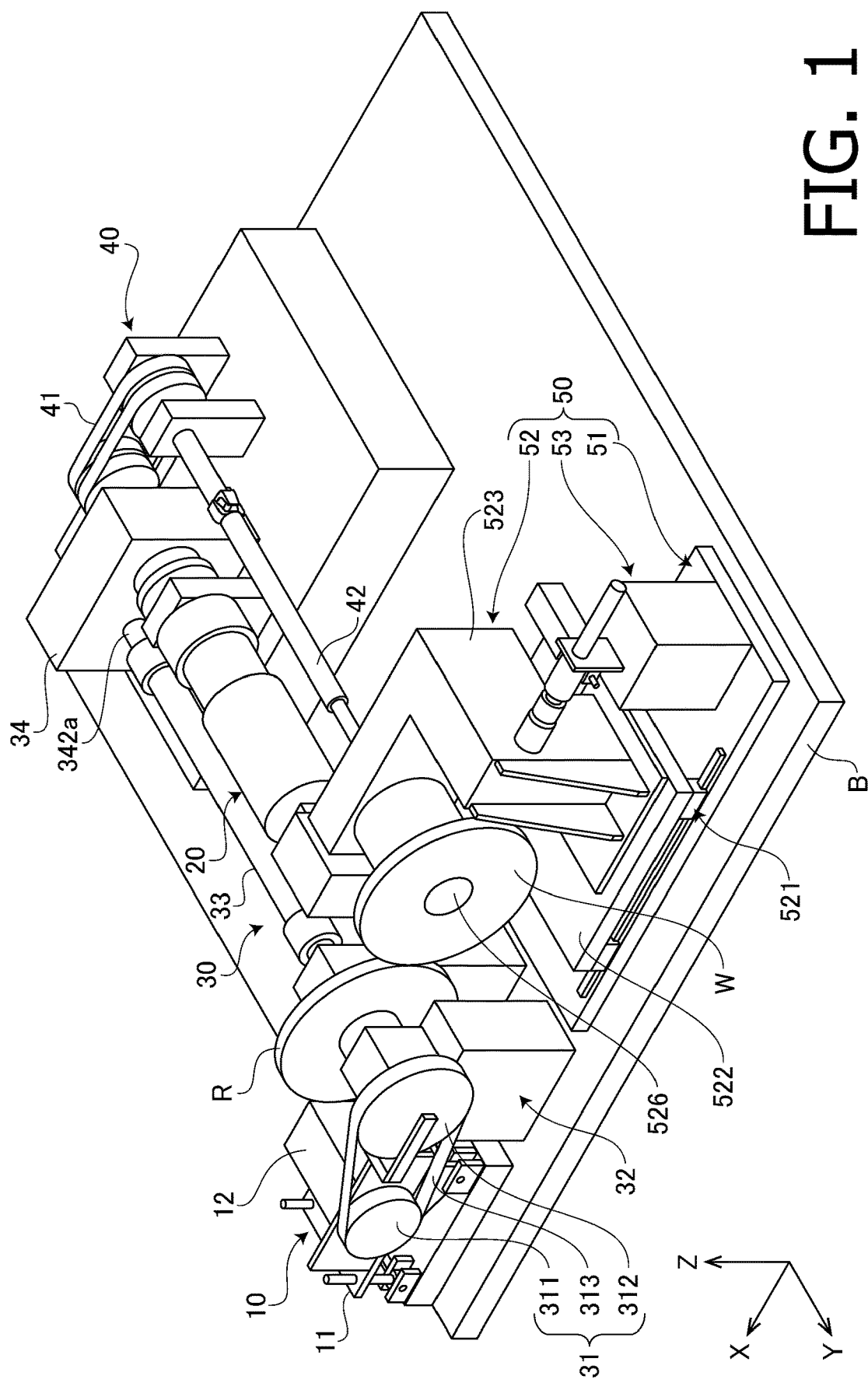
FIG. 1 is a perspective view of a wheel test device.
Figure 2:
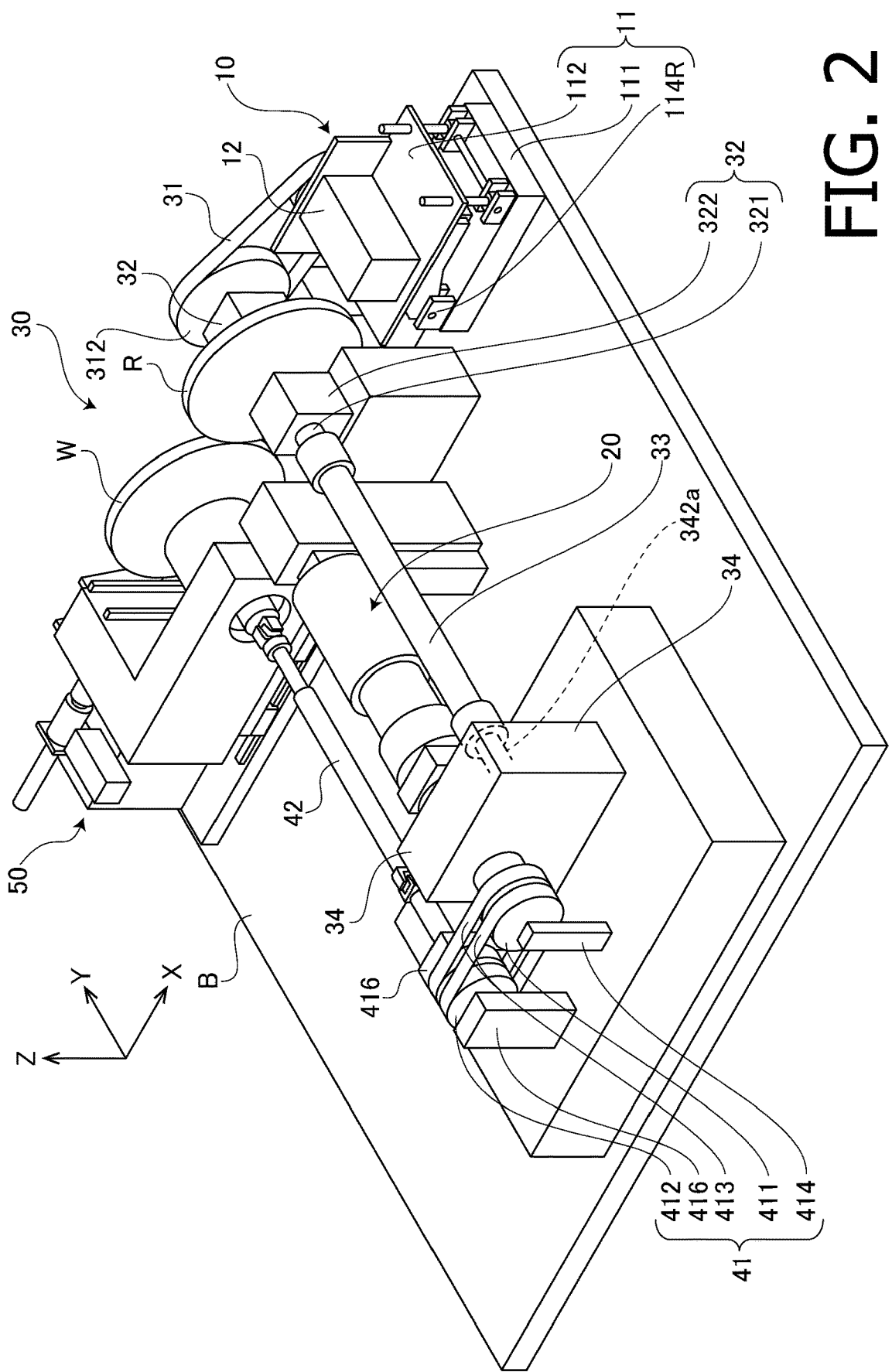
FIG. 2 is a perspective view of the wheel test device.
Figure 3:
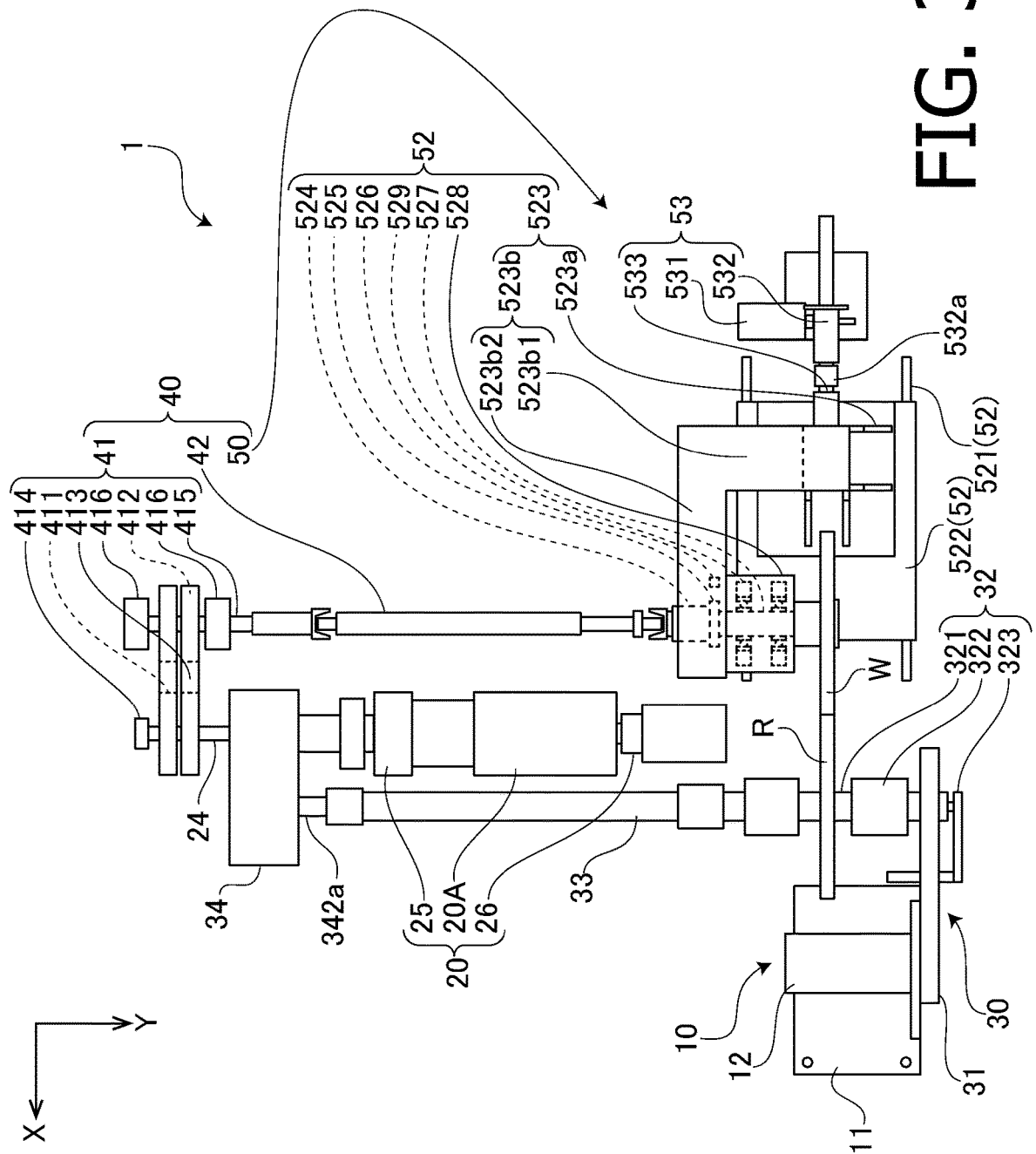
FIG. 3 is a plan view of the wheel test device.

FIGS. 1 and 2 are perspective views of a wheel test device 1 according to a first embodiment of the present disclosure. FIG. 1 is a front side view and FIG. 2 is a rear side view. FIG. 3 is a plan view of the wheel test device 1.

In FIG. 1, as shown by the coordinate axes, a direction from lower right to upper left is defined as an X-axis direction, a direction from upper right to lower left is defined as a Y-axis direction, and a direction from bottom to top is defined as a Z-axis direction. The X-axis direction and the Y-axis direction are horizontal directions orthogonal to each other, and the Z-axis direction is a vertical direction. Arbitrary straight lines respectively extending in the X-axis direction, the Y-axis direction, and the Z-axis direction are referred to as an X-axis, a Y-axis, and a Z-axis, respectively. The X-axis positive direction is referred to as left, the X-axis negative direction is referred to as right, the Y-axis positive direction is referred to as front, the Y-axis negative direction is referred to as rear, the Z-axis positive direction is referred to as up, and the Z-axis negative direction is referred to as down.

The wheel test device 1 is a device capable of simulating an interaction between a rail and a wheel that occurs when a railway vehicle is running, and evaluating, for example, an adhesion property and the like between the rail and the wheel. In the present embodiment, a rail wheel R of which outer periphery having a cross-sectional shape that simulates a rail head is used, and both the rail wheel R and a wheel for tests (hereinafter referred to as a "test wheel W") are rotated in a state where the test wheel W is pressed against the rail wheel R, whereby the interaction between the rail and the wheel when a railway vehicle is running is simulated.

Figure 4:
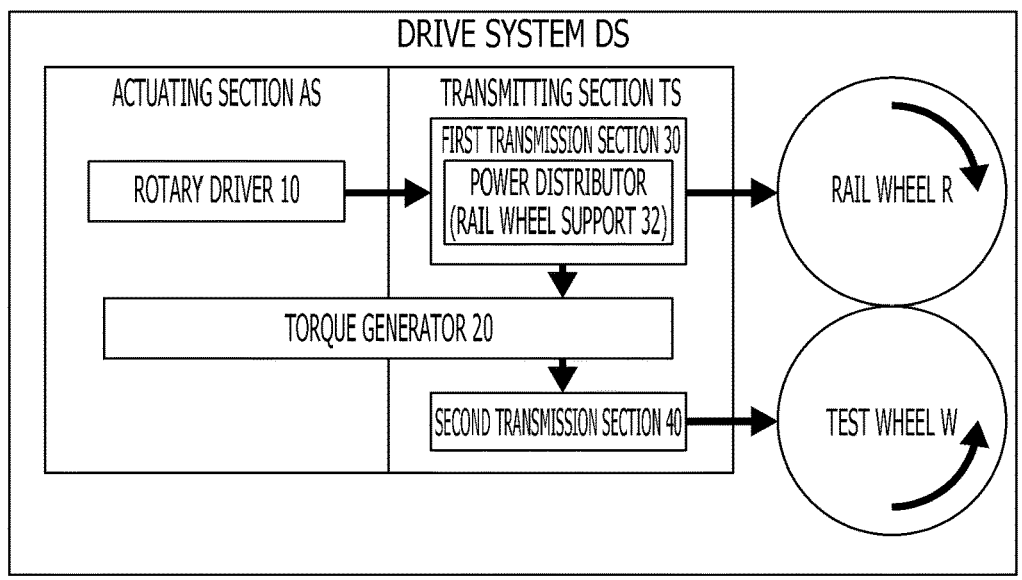
FIG. 4 is a block diagram showing a schematic configuration of a drive system.

The wheel test device 1 includes a drive system DS that drives the rail wheel R and the test wheel W. FIG. 4 is a block diagram showing a schematic configuration of the drive system DS. The drive system DS includes an actuating section AS that generates mechanical power (hereinafter simply referred to as "power") and a transmitting section TS that transmits the power generated by the actuating section AS to the rail wheel R and the test wheel W which are targets to be driven, and constitutes a power circulation system together with the rail wheel R and the test wheel W, as will be described later.

The actuating section AS includes a rotary driver 10 (a speed control drive device) capable of controlling rotation speed of a driven object, and a torque generator 20 (a torque control drive device) capable of controlling torque to be applied to the driven object. In the drive system DS of the present embodiment, by adopting a configuration in which drive control is divided into speed control and torque control and dedicated drivers perform speed control and torque control, respectively, it is made possible to drive at high speed (or at high acceleration) and high torque while using a motor having a relatively small capacity. Furthermore, the drive system DS employs a power circulation system, thereby realizing a higher energy utilization efficiency than those of the conventional devices.

The transmitting section TS includes a first transmission section 30 and a second transmission section 40. The torque generator 20 also constitutes a part of the transmitting section TS. The first transmission section 30 transmits rotation output from the rotary driver 10 to the rail wheel R and the torque generator 20. The torque generator 20 adds power generated by the torque generator 20 itself to the power transmitted from the rotary driver 10 and outputs the added power. The second transmission section 40 transmits the output of the torque generator 20 to the test wheel W.

The rail wheel R and the test wheel W are attached to the wheel test device 1 so that they are arranged in the radial direction with their rotation axes parallel to each other. When performing test, the test wheel W is pressed against the rail wheel R, and the test wheel W and the rail wheel R are driven to rotate in directions opposite to each other at substantially the same peripheral speed (i.e., a linear speed of an outer peripheral surface) in a state where an outer peripheral surface (tread surface) of the test wheel W is in contact with an outer peripheral surface (top surface) of the rail wheel R. At this time, the transmitting section TS together with the test wheel W and the rail wheel R constitutes a power circulation system (i.e., a loop of power transmission shafts). The torque generator 20 applies torque to the power circulation system by giving a phase difference between an input shaft (first transmission section 30) and an output shaft (second transmission section 40). By the adoption of the power circulation system, the wheel test device 1 can apply torque (or tangential force) to the test wheel W without substantially absorbing the generated power, and thus the wheel test device 1 can be operated with relatively little energy consumption.

The first transmission section 30 of the present embodiment is configured so that the rail wheel R and the test wheel W are rotationally driven at the same peripheral speed in opposite directions with respect to each other in a state where the operation of the torque generator 20 (specifically, the second electric motor 22 described later) is stopped. It should be noted that a configuration may be adopted in which a difference in peripheral speed occurs between the rail wheel R and the test wheel W in a state where the operation of the torque generator 20 is stopped. However, in this case, since the amount of operation of the torque generator 20 increases in order to compensate for the difference in peripheral speed, the energy consumption increases. Also, although the first transmission section 30 of the present embodiment is configured so that the rail wheel R and the torque generator 20 are rotationally driven at the same rotation speed, a configuration may be adopted in which the rail wheel R and the torque generator 20 are rotated at different rotation speeds as long as the rail wheel R and the test wheel W are rotationally driven at substantially the same peripheral speed.

As shown in FIG. 1-3, the rotary driver 10 includes a tension adjustment table 11 and a first electric motor 12 (a speed control motor) installed on the tension adjustment table 11. The first electric motor 12 of the present embodiment is a so-called inverter motor whose drive is controlled by an inverter, but another type of motor, such as a servo motor or a stepping motor, in which rotation speed can be controlled, may be used for the first electric motor 12. The rotary driver 10 may include a reducer configured to reduce the rotation output from the first electric motor 12. The tension adjustment table 11 will be described later.

The first transmission section 30 includes a first belt mechanism 31, a rail wheel support 32, a shaft 33, and a gear box 34 (gear device).

As shown in FIG. 1, the first belt mechanism 31 includes a drive pulley 311 driven by the rotary driver 10, a driven pulley 312 attached to an input shaft (one of shafts 321 described later) of the rail wheel support 32, and a belt 313 wound around the drive pulley 311 and the driven pulley 312.

The rotation output from the rotary driver 10 is transmitted to the rail wheel support 32 by the first belt mechanism 31 of the first transmission section 30.

The belt 313 of the present embodiment is a V-ribbed belt having a plurality of V-shaped ribs arranged in a width direction, but may be another type of belt such as a V-belt having a trapezoidal cross-sectional shape, a toothed belt, a flat belt, or a round belt.

The first belt mechanism 31 of the present embodiment includes a single belt transmission system including a drive pulley 311, a driven pulley 312, and a belt 313, but may include two or more belt transmission systems connected in parallel or in series.

The transmission from the rotary driver 10 to the rail wheel support 32 is not limited to belt transmission, but other types of winding transmission such as chain transmission or wire transmission, or other transmission systems such as gear transmission may be used. The rotary driver 10 and the rail wheel support 32 may be disposed coaxially (i.e., so that the rotation axes or the center lines are coincident with each other) and an output shaft of the rotary driver 10 and an input shaft of the rail wheel support 32 may be directly connected to each other.

The tension adjustment table 11 of the rotary driver 10 will now be described. As shown in FIG. 2, the tension adjustment table 11 includes a fixed frame 111 fixed to a base B and a movable frame 112 to which the rotary driver 10 is attached. The movable frame 112 is pivotally connected to the fixed frame 111 via a rod 114R extending in the Y-axis direction at a right end portion of the movable frame 112, so that an inclination around the Y-axis can be adjusted. A distance between the drive pulley 311 (FIG. 1) and the driven pulley 312 can be changed by changing the inclination of the movable frame 112, whereby it is made possible to adjust the tension of the belt 313 wound around the drive pulley 311 and the driven pulley 312.

As shown in FIGS. 2 and 3, the rail wheel support 32 includes a pair of bearings 322 and a pair of shafts 321. The pair of bearings 322 are arranged across the rail wheel R, in front of and behind the rail wheel R (i.e., arranged in the Y-axis direction), with the rotation axes thereof oriented the Y-axis direction, and are coaxially arranged.

One shaft 321 is rotatably supported by the front bearing 322, and the other shaft 321 is rotatably supported by the rear bearing 322. The shafts 321 are flanged shafts each provided with a flange configured for mounting the rail wheel R at one end thereof, and are removably and coaxially mounted on respective side surfaces of the rail wheel R by bolts.

The driven pulley 312 of the first belt mechanism 31 is attached to the other end of the front shaft 321. One end of the shaft 33 is connected to the other end of the rear shaft 321. The other end of the shaft 33 is connected to an input shaft 342a of the gear box 34.

Part of the power transmitted by the first belt mechanism 31 to the rail wheel support 32 is given to the rail wheel R, and the rest is given to the shaft 33 (and to the test wheel W via the shaft 33, the torque generator 20, and the second transmission section 40). That is, the rail wheel support 32 (specifically, the shafts 321) functions as a power distributor configured to distribute the power generated by the first electric motor 12 and transmitted by the first belt mechanism 31 to the rail wheel R and the shaft 33 (and finally to the test wheel W).

The coupling structure between the shafts 321 and the rail wheel R is not limited to the coupling by the flange, but may be another coupling structure such as, for example, a structure in which the shaft 321 is fitted into a through hole provided at the center of the rail wheel R.

As shown in FIG. 3, the rail wheel support 32 includes a rotary encoder 323 (a rotation speed detector) configured to detect a rotation speed of the rail wheel R.

Figure 5:
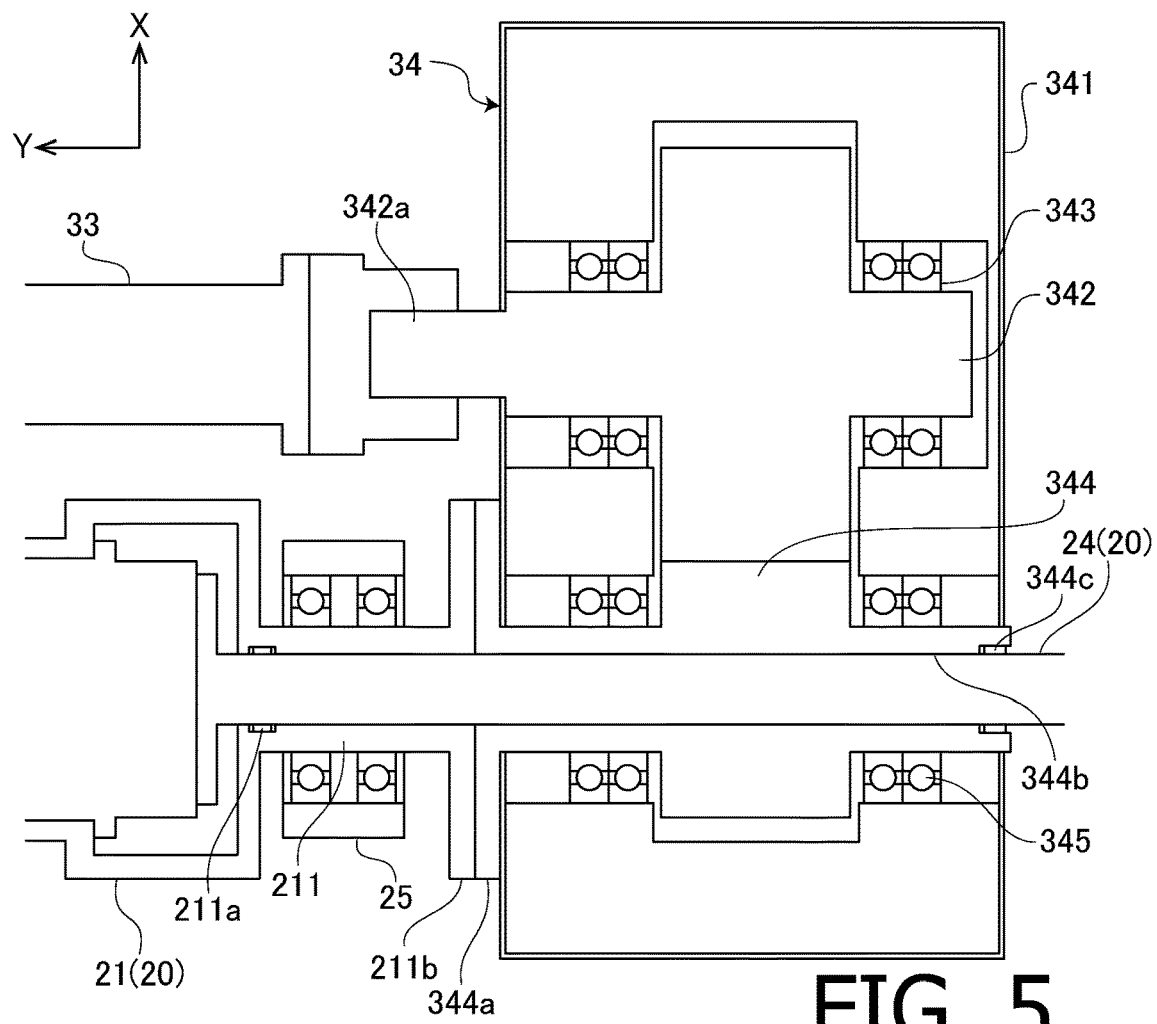
FIG. 5 is a cross-sectional view showing a schematic configuration of a gear box.

FIG. 5 is a schematic cross-sectional view of the gear box 34 and its periphery cut along a horizontal plane. The gear box 34 includes a case 341, a pair of first bearings 343 and a pair of second bearings 345 attached to the case 341, a first gear 342 (an input gear) rotatably supported by the pair of first bearings 343, and a second gear 344 (an output gear) rotatably supported by the pair of second bearings 345.

The first gear 342 and the second gear 344 are arranged side by side in the X-axis direction with the rotation axes oriented in the Y-axis direction so that their teeth mesh with each other, and are housed in the case 341. One end of the first gear 342 is the input shaft 342a of the gear box 34 and is connected to the other end of the shaft 33. A flange formed at one end of the second gear 344 is an output shaft 344a of the gear box 34 and is connected to a flange (an input shaft 211b) formed at one end of a later-described casing 21 of the torque generator 20.

The second gear 344 is formed with a cylindrical through hole 344b centered on the rotation axis. An output shaft 24 of the torque generator 20, which will be described later, is inserted into the through hole 344b from one end of the second gear 344 (the left end in FIG. 5, i.e., the front end of the output shaft 344a), penetrates the second gear 344, and a front end thereof protrudes from the other end of the second gear 344.

In the present embodiment, the first gear 342 and the second gear 344 have the same number of teeth, and thus a gear ratio of the gear box 34 is 1. The gear ratio of the gear box 34 may be set to a value other than 1 as long as the test wheel W and the rail wheel R can be rotated in the opposite direction at substantially the same peripheral speed.

The transmission from the shaft 33 to the torque generator 20 is not limited to the gear transmission, but other transmission systems such as, for example, a winding transmission such as a belt transmission or a chain transmission may be used.

Figure 6:
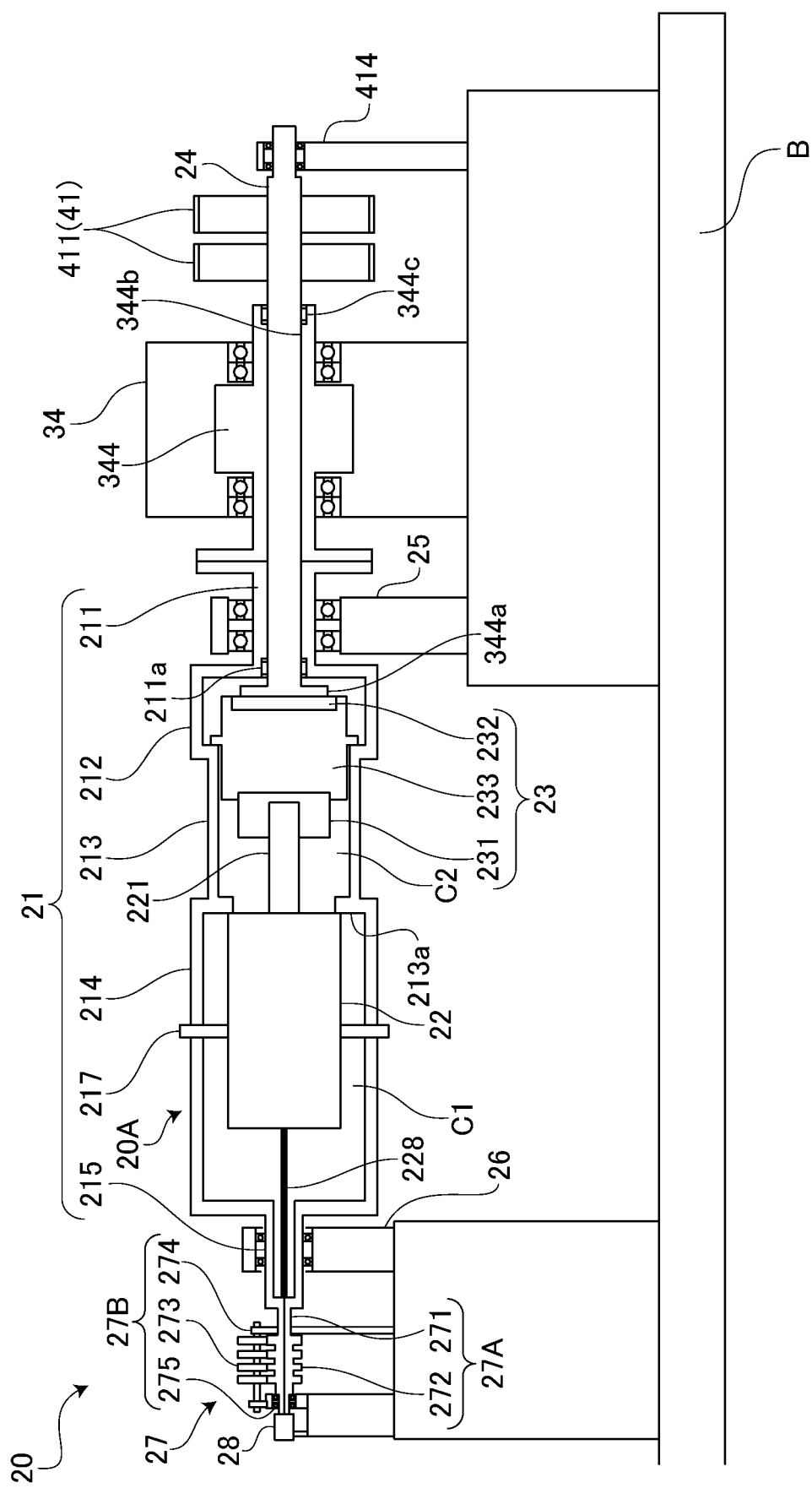
FIG. 6 is a cross-sectional view showing a schematic configuration of a torque generator and its periphery.

FIG. 6 is a schematic cross-sectional view of the torque generator 20, the gear box 34, and the periphery thereof taken along a plane perpendicular to the X-axis direction.

The torque generator 20 includes a main body 20A (rotating part) rotationally driven by the rotary driver 10, and a pair of bearing units 25 and 26 configured to rotatably support the main body 20A.

The main body 20A includes a substantially cylindrical casing 21 (rotating frame) supported by bearing units 25 and 26, a second electric motor 22 and a reducer 23 attached to the casing 21, and an output shaft 24. The output shaft 24 is disposed coaxially with the casing 21. A shaft 221 and a rotor 222 of the second electric motor 22 which will be described later may be disposed coaxially with the casing 21. By arranging the second electric motor 22 coaxially with the casing 21, unbalance of the main body 20A is reduced, and it becomes possible to rotate the main body 20A smoothly (i.e., with less unnecessary fluctuation of the rotation speed and torque). Although the second electric motor 22 in this embodiment is an AC servo motor, other types of electric motor capable of controlling driving amount (rotation angle), such as a DC servo motor or a stepping motor, may be used as the second electric motor 22. In the present embodiment, as the second electric motor 22, an ultra-low inertia high power type AC servo motor of which moment of inertia of a rotating part is 0.01 kg·m² or less (more preferably 0.008 kg·m² or less) and a rated output is 3 kW to 60 kW (more practically 7 kW to 37 kW) is used. As a result, it is possible to generate rapid torque change (e.g., a vibration torque of a high frequency exceeding 500 Hz or 1 kHz).

The casing 21 has a substantially cylindrical first cylindrical part 212 and a substantially cylindrical second cylindrical part 214 (a motor housing part), a connecting part 213 that connects the first cylindrical part 212 and the second cylindrical part 214, a first shaft part 211 connected to the first cylindrical part 212, and a second shaft part 215 connected to the second cylindrical part 214. The first shaft part 211, the first cylindrical part 212, the connecting part 213, the second cylindrical part 214, and the second shaft part 215 are all cylindrical members having a hollow portion passing through in the axial direction, and are coaxially connected in this order to form the cylindrical casing 21. The casing 21 is supported at the first shaft part 211 by the bearing unit 25 and at the second shaft part 215 by the bearing unit 26. A flange formed at the tip end of the first shaft part 211 is the input shaft 211b (FIG. 5) of the torque generator 20, and is connected to the output shaft 344a of the gear box 34.

Figure 7:
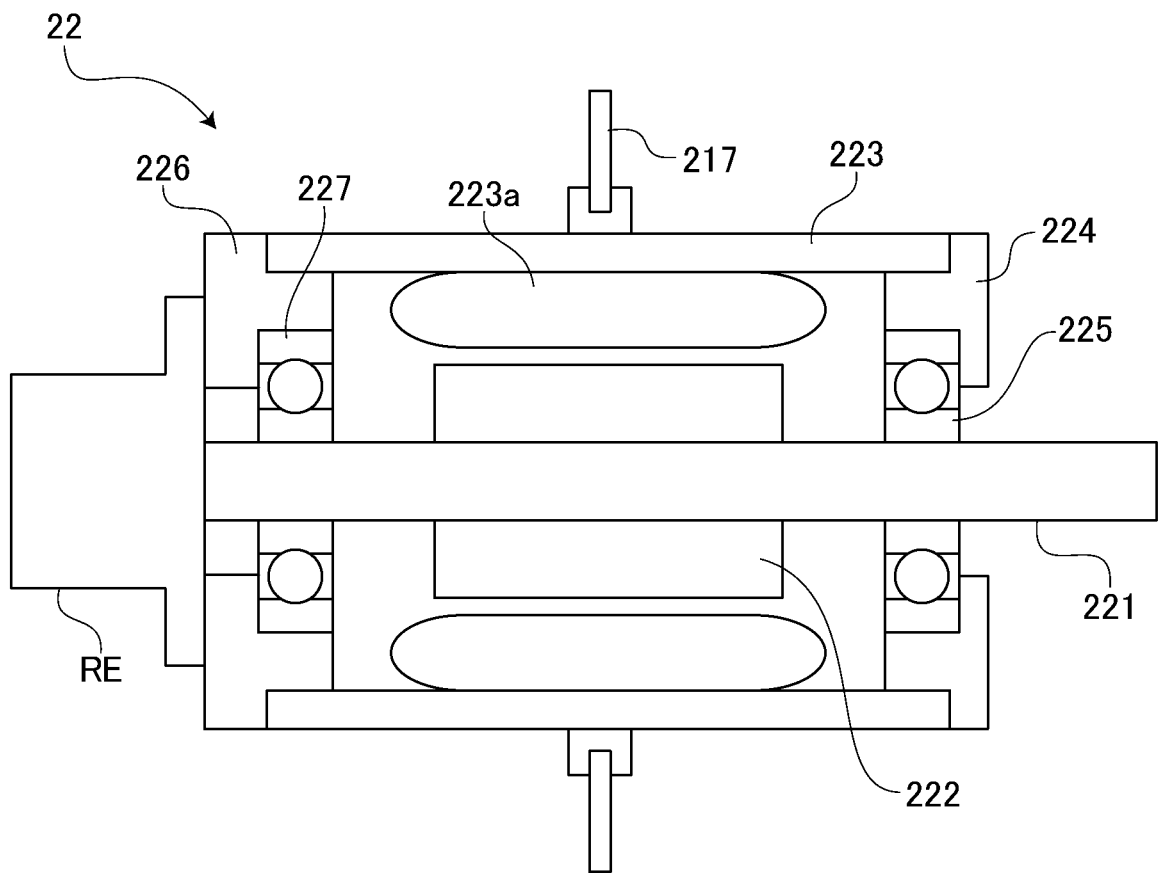
FIG. 7 is a cross-sectional view showing a schematic configuration of a second electric motor.

FIG. 7 is a vertical cross-sectional view showing a schematic configuration of the second electric motor 22. The second electric motor 22 includes a shaft 221, a rotor 222 composed of a permanent magnet or the like and integrally coupled with the shaft 221, a tubular stator 223 provided with a coil 223a on its inner periphery, a pair of flanges 224 and 226 attached to both ends of the stator 223 so as to close openings, a pair of bearings 225 and 227 attached to the respective flanges 224 and 226, and a rotary encoder RE configured to detect an angular position (phase) of the shaft 221.

The shaft 221 is rotatably supported by the pair of bearings 225 and 227. One end (the right end in FIG. 7) of the shaft 221 protrudes to the outside through the flange 224 and the bearing 225 and serves as an output shaft of the second electric motor 22. The other end (the left end in FIG. 7) of the shaft 221 is connected to the rotary encoder RE.

As shown in FIG. 6, the second electric motor 22 is housed in a hollow portion (compartment C1) of the second cylindrical part 214 of the casing 21. One end (left end in FIG. 6) of the connecting part 213 of the casing 21 is formed with an inner flange part 213a projecting to the inner periphery. The stator 223 (FIG. 7) of the second electric motor 22 is fixed to the second cylindrical part 214 via a plurality of rod-shaped coupling members 217 radially arranged around the rotation axis of the torque generator 20. As the coupling members 217, for example, stud bolts or full-threaded bolts having male screws formed at both ends are used. The flange 224 (FIG. 7) of the second electric motor 22 is supported by the inner flange part 213a of the connecting part 213.

The reducer 23 is housed in a compartment C2 surrounded by the connecting part 213 and the first cylindrical part 212 of the casing 21. The shaft 221 of the second electric motor 22 is connected to an input shaft 231 of the reducer 23, and the output shaft 24 of the torque generator 20 is connected to an output shaft 232 of the reducer 23. The output shaft 24 may be directly connected to the shaft 221 of the second electric motor 22 without providing the reducer 23 in the torque generator 20.

A case 233 of the reducer 23 is fixed to the other end of the connecting part 213. That is, the flange 224 of the second electric motor 22 (FIG. 7) and the case 233 of the reducer 23 are integrally coupled to each other by a single cylindrical connecting part 213. Therefore, the second electric motor 22 and the reducer 23 are integrally coupled with high rigidity, and it is made difficult to apply bending moment to the shaft 221. As a result, friction that the shaft 221 receives from the bearings 225 and 227 (FIG. 7) can be reduced, and thus accuracy of torque control by the torque generator 20 improves.

The output shaft 24 of the torque generator 20 passes through the hollow portions of the first shaft part 211 of the casing 21 and the gear box 34 (specifically, the second gear 344) and protrudes to the rear of the gear box 34. A bearing 211a and a bearing 344c configured to rotatably support the output shaft 24 are provided on the inner peripheries of the first shaft part 211 of the casing 21 and the second gear 344 of the gear box 34, respectively.

Two drive pulleys 411 of a second belt mechanism 41, which will be described later, are attached to a distal end portion of the output shaft 24 protruding rearward from the gear box 34. The distal end portion of the output shaft 24 is rotatably supported by a bearing unit 414 of the second belt mechanism 41.

A slip ring part 27 is provided adjacent to the front side (left side in FIG. 6) of the bearing unit 26. The slip ring part 27 includes a movable part 27A that rotates together with the main body 20A of the torque generator 20 and a fixed part 27B that is fixed to the base B.

The movable part 27A includes a ring support tube 271 coaxially connected to the second shaft part 215 of the torque generator 20, and a plurality of slip rings 272 coaxially attached to an outer periphery of the ring support tube 271 at intervals in the axial direction.

A cable 228 of the second electric motor 22 of the torque generator 20 passes through the second shaft part 215 of the casing 21. A plurality of electric wires constituting the cable 228 pass through a hollow portion of the ring support tube 271 and are connected to the corresponding slip rings 272.

The fixed part 27B includes a brush support part 274, a plurality of brushes 273 supported by the brush support part 274, and a bearing part 275 that rotatably supports a tip portion of the ring support tube 271. The brushes 273 are arranged at intervals in the Y-axis direction so as to be in contact with outer peripheral surfaces of the corresponding slip rings 272. The brushes 273 are wired and connected to a servo amplifier 22a and the like which will be described later.

A rotary encoder 28 configured to detect the rotation speed of the ring support tube 271 (i.e., the rotation speed of the casing 21 being the input shaft of the torque generator 20) is attached to the bearing part 275.

As shown in FIG. 3, the second transmission section 40 includes a second belt mechanism 41, a slide type constant velocity joint 42, and a wheel support 50.

The second belt mechanism 41 includes two sets of belt transmission systems each including a drive pulley 411, a driven pulley 412, and a belt 413, a bearing unit 414, a shaft 415, and a pair of bearing units 416.

As described above, the two drive pulleys 411 are attached to the distal end portion of the output shaft 24 of the torque generator 20 passing through the gear box 34. The bearing unit 414 rotatably supports the distal end portion of the output shaft 24.

An additional bearing unit 414 may be provided between the gear box 34 and the drive pulley 411 so that the distal end of the output shaft 24 is supported by a pair of bearing units 414. In the present embodiment, the drive pulley 411 is directly attached to the output shaft 24 of the torque generator 20, but a shaft configured to support the drive pulley 411 may be provided separately from the output shaft 24 so that the shaft connected to the output shaft 24 is supported by the bearing unit 414.

The two driven pulleys 412 are attached to the shaft 415 rotatably supported by the pair of bearing units 416.

Each belt 413 is wound around corresponding drive pulley 411 and driven pulley 412.

The belt 413 of the present embodiment is a toothed belt having a core wire of a steel wire. The belt 413 may be a belt having a core wire formed of a so-called super fiber such as carbon fiber, aramid fiber, or ultra-high molecular weight polyethylene fiber. By using a lightweight and high-strength core wire such as a carbon core wire formed of carbon fiber, it becomes possible to drive at a high acceleration (or to apply a high driving/braking force to the test wheel W) using a motor having a relatively low output, and thus it becomes possible to reduce the size of the wheel test device 1. When a motor having the same output is used, it is possible to increase the performance of the wheel test device 1 by using a lightweight (i.e., low inertia) belt 413 having a core wire formed of the so-called super fiber. A general automotive or industrial timing belt may be used as the belt 413. A flat belt or a V-belt may be used as the belt 413 in place of the toothed belt. These belts that can be used as the belt 413 can also be used as the belt 313 of the first belt mechanism 31.

The second belt mechanism 41 of the present embodiment includes a pair of belt transmission systems connected in parallel, but may include a single belt transmission system or three or more belt transmission systems connected in parallel.

The transmission from the torque generator 20 to the to the slide type constant velocity joint 42 is not limited to belt transmission, and other types of winding transmission such as chain transmission or wire transmission, or other transmission systems such as gear transmission may be used. The torque generator 20 and the slide type constant velocity joint 42 may be arranged in a substantially straight line (or in a V-shape), and the output shaft 24 of the torque generator 20 and the input shaft of the slide type constant velocity joint 42 may be directly connected.

The wheel support 50 is connected to the torque generator 20 via the slide type constant velocity joint 42. Specifically, one end portion (i.e., an input shaft) of the slide type constant velocity joint 42 is connected to the shaft 415 of the second belt mechanism 41, and the other end portion (i.e., an output shaft) of the slide type constant velocity joint 42 is connected to a later-described spindle 527 of the wheel support 50.

The slide type constant velocity joint 42 is configured to be able to smoothly transmit rotation without rotation fluctuation regardless of an operating angle (i.e., an angle formed by the input shaft and the output shaft). The slide type constant velocity joint 42 also has a variable length (transmission distance) in the axial direction.

As will be described later, the spindle 527 is supported so that its position can change. By connecting the spindle 527 to the shaft 415 of the second belt mechanism 41 (or to the output shaft 24 of the torque generator 20) via the slide type constant velocity joint 42, even if the position of the spindle 527 changes, the slide type constant velocity joint 42 flexibly follows this change, so that large strain is prevented from being applied to the spindle 527 and the shaft 415 (or to the output shaft 24 of the torque generator 20), and rotation can be smoothly transmitted to the spindle 527. By using the slide type constant velocity joint 42, the rotation speed transmitted to the spindle 527 is prevented from changing depending on the position of the spindle 527 (or the operating angle of the slide type constant velocity joint 42).

As shown in FIG. 1, the wheel support 50 includes a fixed base 51, and a main body 52 and a wheel load applying mechanism 53 disposed on the fixed base 51.

As shown in FIG. 3, the main body 52 includes a movable base 522, a pair of linear guides 521 that support the movable base 522 so as to be movable in the X-axis direction with respect to the fixed base 51, a support frame 523 installed on the movable base 522, a bearing unit 528 attached to the support frame 523, a spindle 527 rotatably supported by the bearing unit 528, a torque sensor 524 and a detection gear 525 coaxially attached to the spindle 527, and a rotation detector 526 configured to detect rotation of the detection gear 525. The linear guide 521 is a guide-way type circulating rolling bearing provided with a linear rail (guideway) and a carriage capable of running on the rail via rolling elements. However, other types of linear guide mechanism may be used as the linear guide 521. The linear guide 521 constitutes a part of the wheel load applying mechanism 53. The detection gear 525 and the rotation detector 526 constitute a rotation speed detector configured to detect the rotation speed of the spindle 527.

The support frame 523 has a support column 523a fixed to the movable base 522 and an arm 523b fixed to the support column 523a. Although the support column 523a of the present embodiment is an L-shaped bracket, other types of support column 523a may be used. The support column 523a and the arm 523b may be integrally formed. The arm 523b is a substantially L-shaped structure as seen from above, having a base part 523b1 extending rearward from an upper portion of the support column 523a and a trunk part 523b2 extending leftward from a rear end portion of the base part 523b1. A hollow portion penetrating in the Y-axis direction is formed at a distal end portion of the trunk part 523b2. A drive shaft (specifically, an assembly of the slide type constant velocity joint 42, the torque sensor 524, the detection gear 525, and the spindle 527 connected to each other) passes through the hollow portion.

The bearing unit 528 is attached to the arm 523b. More specifically, the bearing unit 528 is attached to a front surface of the front end portion of the trunk part 523b2 with the rotation axis thereof oriented in the Y-axis direction. The bearing unit 528 is provided with a plurality of three component force sensors 529 (tangential force detectors and first lateral pressure detectors) configured to detect force received from the spindle 527. The three component force sensors 529 are piezoelectric force sensors, but other types of force sensors may be used as the three component force sensors 529.

The spindle 527 is connected to the output shaft of the slide type constant velocity joint 42 via the detection gear 525 and the torque sensor 524. The detection gear 525 and the torque sensor 524 are housed in a hollow portion formed at a distal end portion of the trunk part 523b2. The test wheel W is attached to a mounting portion provided at a distal end portion of the spindle 527. The torque sensor 524 detects a torque acting on the spindle 527 (i.e., acting on the test wheel W).

The rotation detector 526 is disposed to face an outer peripheral surface of the detection gear 525 and is fixed to the trunk part 523b2 of the support frame 523. The rotation detector 526 is, for example, a non-contact type rotation detector such as an optical type, an electromagnetic type, or a magnetoelectric type, and detects a change in an angular position of the detection gear 525.

The wheel load applying mechanism 53 is a mechanism that applies a wheel load of a predetermined size to the test wheel W by moving the main body 52 of the wheel support 50 in the X-axis direction and pressing the test wheel W attached to the spindle 527 against the rail wheel R.

The wheel load applying mechanism 53 includes a motor 531, a motion converter 532 that converts a rotational motion of the motor 531 into a linear motion in the X-axis direction, and a wheel load detector 533 (FIG. 10) configured to detect a wheel load acting on the test wheel W.

Although the motor 531 is an AC servo motor, other types of electric motor capable of controlling drive amount (rotation angle), such as a DC servo motor or a stepping motor, may be used as the motor 531.

The motion converter 532 of the present embodiment is, for example, a screw jack in which a reducer such as a worm gear device is combined with a feed screw mechanism such as a ball screw, but other types of motion converter may be used. A linearly moving part 532a of the motion converter 532 is fixed to the support frame 523 via the wheel load detector 533.

When the motor 531 drives the motion converter 532, the support frame 523 and the spindle 527 supported by the support frame 523 move in the X-axis direction together with the linearly moving part 532a. As a result, the test wheel W attached to the spindle 527 moves back and forth with respect to the rail wheel R. When the motor 531 drives the motion converter 532 further in a direction in which the test wheel W moves toward the rail wheel R (i.e., in the X-axis positive direction) in a state where the test wheel W and the rail wheel R are in contact with each other, the test wheel W is pressed against the rail wheel R, and the wheel load is applied to the test wheel W.

The wheel load detector 533 is a force sensor that detects a force in the X-axis direction (i.e., wheel load) acting on the test wheel W via the support frame 523 and the spindle 527 by the wheel load applying mechanism 53. The wheel load detector 533 of the present embodiment is a load cell of a strain gauge type, but other types of force sensor such as a piezoelectric force sensor may be used as the wheel load detector 533. A controller 70 which will be described later controls the drive of the motor 531 so that the wheel load of a predetermined magnitude is applied to the test wheel W based on the detection result by the wheel load detector 533.

Figure 8:
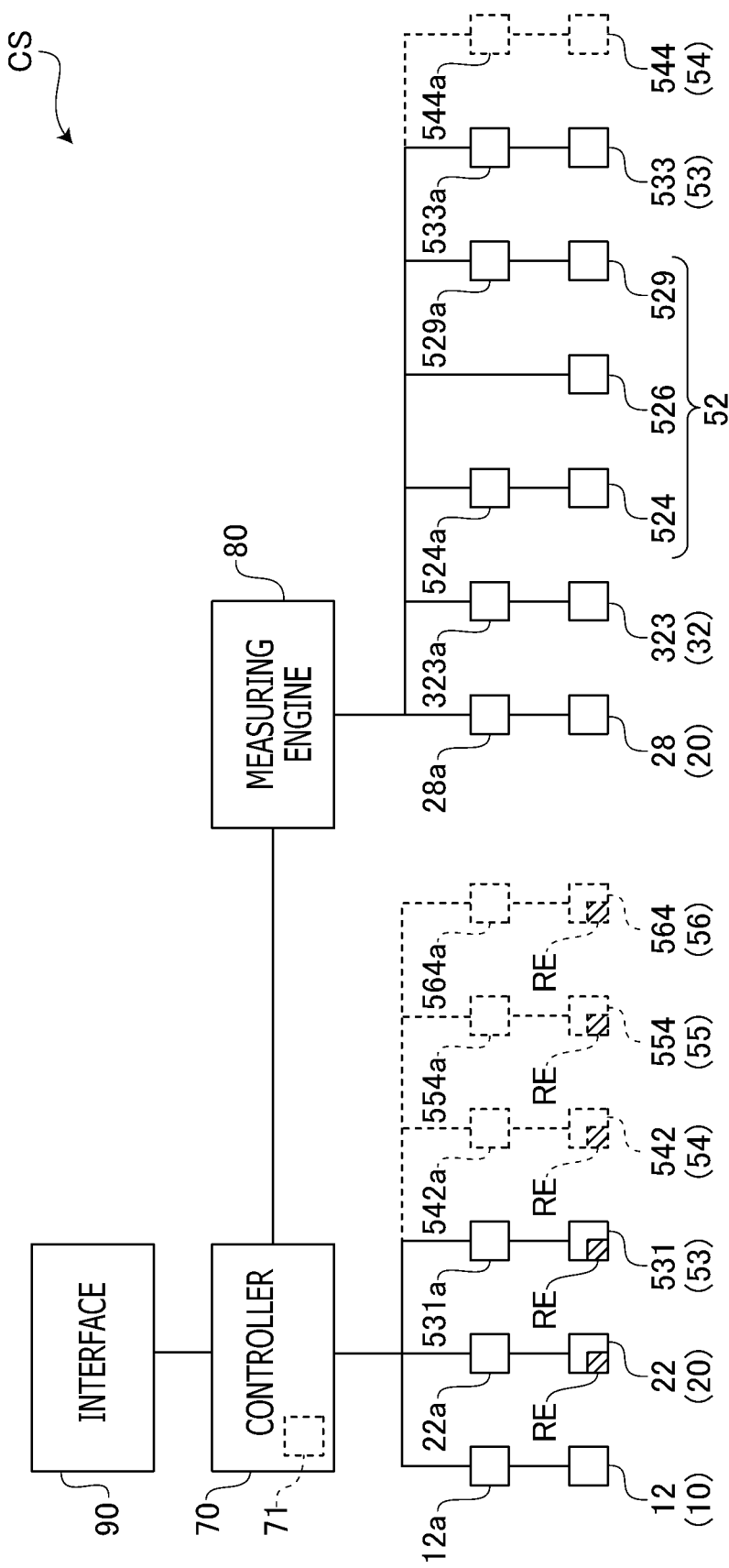
FIG. 8 is a block diagram showing a schematic configuration of a control system.

FIG. 8 is a block diagram showing a schematic configuration of a control system CS of the wheel test device 1. The control system CS includes a controller 70 that controls operation of the entire wheel test device 1, a measuring engine 80 that performs various measurements based on signals from various detectors provided to the wheel test device 1, and an interface 90 configured for performing input from and output to the outside.

The second electric motor 22 and the motor 531 are connected to the controller 70 via servo amplifiers 22a and 531a, respectively, and the first electric motor 12 is connected to the controller 70 via a driver 12a (inverter circuit).

The rotary encoders 28 and 323, the torque sensor 524, the three component force sensors 529, and the wheel load detector 533 are connected to the measuring engine 80 via amplifiers 28a, 323a, 524a, 529a, and 533a, respectively. In FIG. 8, only one representative set is shown among a plurality of sets of three component force sensors 529 and amplifiers 529a provided to the wheel test device 1. The rotation detector 526 embedded with an amplifier circuit and an analog-to-digital conversion circuit is directly connected to the measuring engine 80.

The measuring engine 80 measures the rotation speed of the rail wheel R on the basis of a signal from a rotary encoder 323, measures the rotation speed of the input shaft (casing 21) of the torque generator 20 on the basis of a signal from the rotary encoder 28, measures the rotation speed of the spindle 527 (i.e., the rotation speed the test wheel W) on the basis of a signal from the rotation detector 526. The measuring engine 80 further measures the torque acting on the test wheel W on the basis of a signal from the torque sensor 524, measures a tangential force (longitudinal creep force) and a lateral pressure (thrust load) acting on the test wheel W on the basis of signals from a plurality of three component force sensors 529, and measures the wheel load on the basis of a signal from a wheel load detector 533. That is, the measuring engine 80 functions as a first rotation speed measuring unit configured to measure the rotation speed of the rail wheel R, a second rotation speed measuring unit configured to measure the rotation speed of the torque generator 20, a third rotation speed measuring unit configured to measure the rotation speed of the test wheel W, a torque measuring unit configured to measure the torque acting on the test wheel W, a tangential force measuring unit configured to measure the tangential force acting on the test wheel W, a lateral pressure measuring unit configured to measure the lateral pressure acting on the test wheel W, and a wheel load measuring unit configured to measure the wheel load acting on the test wheel W. The measuring engine 80 transmits these measured values to the controller 70.

Although the wheel test device 1 of the present embodiment includes many measuring unit and corresponding detectors because it is a relatively versatile device, the wheel test device 1 need not be provided with all of these measuring unit and detectors, but may be provided with one or more sets of measuring unit and detectors which are appropriately selected according to the matters to be examined by the test.

The phase information of the shaft detected by the rotary encoder RE embedded in each servo motor (the second electric motor 22 and the motor 531) is input to the controller 70 via the corresponding servo amplifiers 22a, 531a.

The interface 90 includes, for example, one or more of a user interface configured for performing input/output with a user, a network interface configured to connect with various networks such as the LAN (Local Area Network), and various communication interfaces such as the USB (Universal Serial Bus) and the GPIB (General Purpose Interface Bus) configured to connect with external devices. The user interface includes, for example, one or more of various operation switches, various display devices such as indicators and LCD (Liquid Crystal Display), various pointing devices such as a mouse and a touch pad, and various input/output devices such as a touch screen, a video camera, a printer, a scanner, a buzzer, a speaker, a microphone, and a memory card reader/writer.

The controller 70 controls the driving of the first electric motor 12 based on setting data of the rotation speed (or peripheral speed) of the rail wheel R inputted through the interface 90 and the measurement result of the rotation speed of the rail wheel R by the measuring engine 80 so that the rail wheel R rotates at a set rotation speed.

The controller 70 controls the driving of the motor 531 of the wheel load applying mechanism 53 based on wheel load setting data input through the interface 90 and the wheel load measurement result by the measuring engine 80 so that a set wheel load is applied to the test wheel W.

The controller 70 controls the driving of the second electric motor 22 of the torque generator 20 based on setting data of the torque of the test wheel W inputted through the interface 90 and the measurement result of the torque of the test wheel W by the measuring engine 80 so that a set torque is applied to the test wheel W.

Next, an example of a method of performing a test using the wheel test device 1 will be described. First, the controller 70 drives the motor 531 of the wheel load applying mechanism 53 in a state where the rail wheel R and the test wheel W are attached to the wheel test device 1 to bring the test wheel W close to and into contact with the rail wheel R, and applies the set wheel load to the test wheel W. As the set value of the wheel load, a constant value or a variable value that varies with time can be set.

Then, the controller 70 drives the first electric motor 12 of the rotary driver 10 so that the rail wheel R rotates at the set rotation speed. As the set value of the rotation speed of the rail wheel R, a constant value or a variable value that varies with time can be set. The controller 70 also controls the second electric motor 22 so that the torque of the test wheel W is 0 (no load) until the rotation speed of the rail wheel R reaches the set value.

As the rotation speed of the rail wheel R reaches the set value, the controller 70 controls the driving of the second electric motor 22 of the torque generator 20 so that the set torque is applied to the test wheel W. As the set value of the torque of the test wheel W, a constant value or a variable value that varies with time can be set. The driving of the second electric motor 22 may be controlled so that the set torque is applied to the test wheel W from the start of the rotational drive of the rail wheel R.

In this state, the controller 70 rotates the rail wheel R and the test wheel W while continuously measuring the rotation speed of the rail wheel R, the torque of the test wheel W, the tangential force, the lateral pressure, and the wheel load for a predetermined time (test time). At this time, the controller 70 stores each measurement value in a storage device 71 of the controller 70 (or, for example, a storage accessible by the controller 70 such as a server connected to the controller 70 via a LAN) in association with the measured time.

When a predetermined time elapses, the controller 70 controls the driving of the second electric motor 22 of the torque generator 20 so that the torque of the test wheel W becomes 0. Then, the controller 70 controls the first electric motor 12 of the rotary driver 10 to gradually reduce the rotation speed of the rail wheel R to stop the rotation, and then drives the motor 531 of the wheel load applying mechanism 53 to move the test wheel W away from the rail wheel R by a predetermined distance to end the test.

The test procedure described above is only an example of test procedures that can be performed using the wheel test device 1, and various other test procedures can be performed.

Second Embodiment

Next, a second embodiment of the present disclosure will be described. In the following description of the second embodiment, emphasis is placed on matters different from those of the first embodiment described above, and configurations that are the same as or correspond to those of the first embodiment are assigned the same or corresponding reference numerals, and redundant description is omitted.

Figure 9:
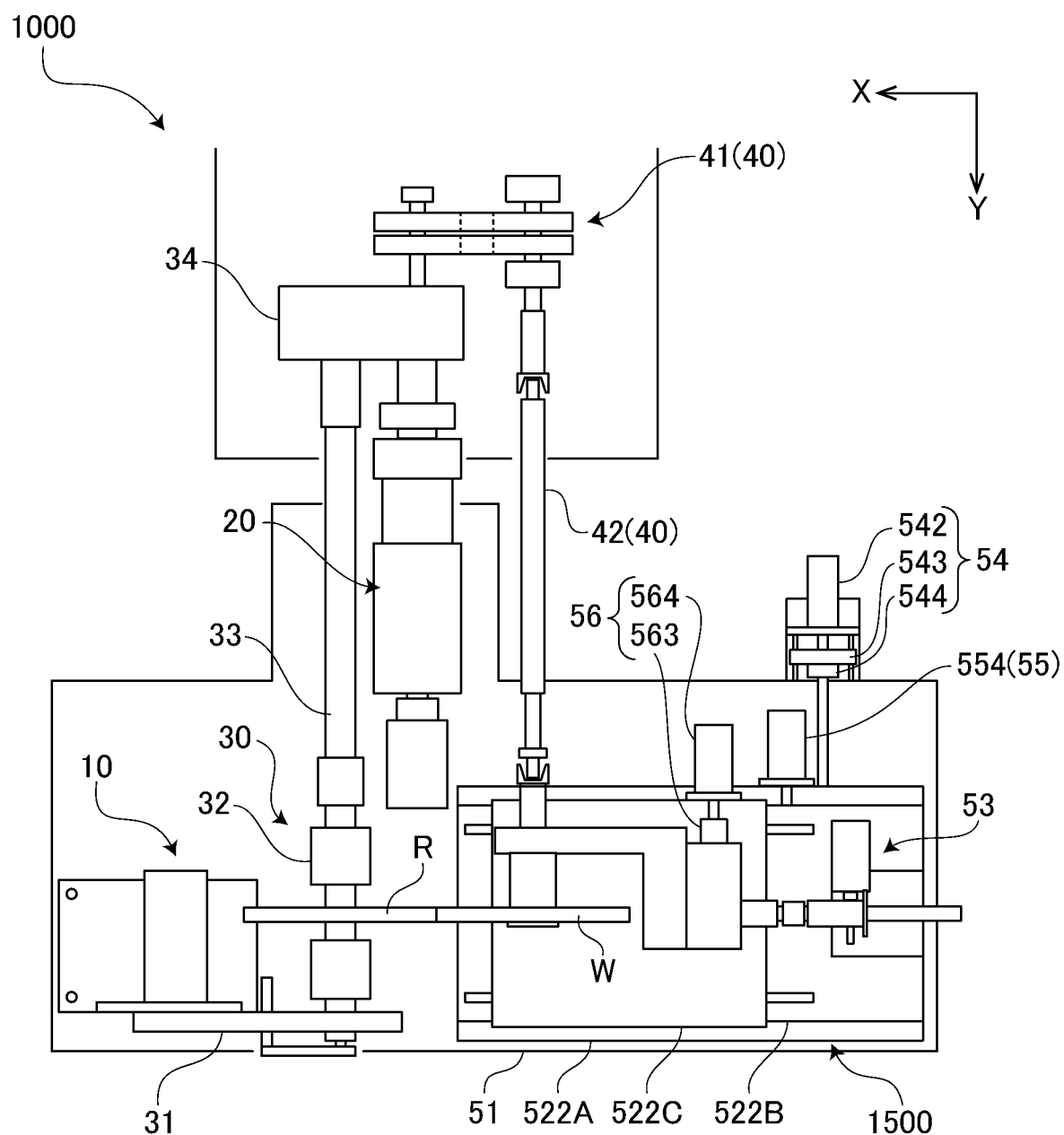
FIG. 9 is a plan view showing a schematic configuration of another wheel test device.
Figure 10:
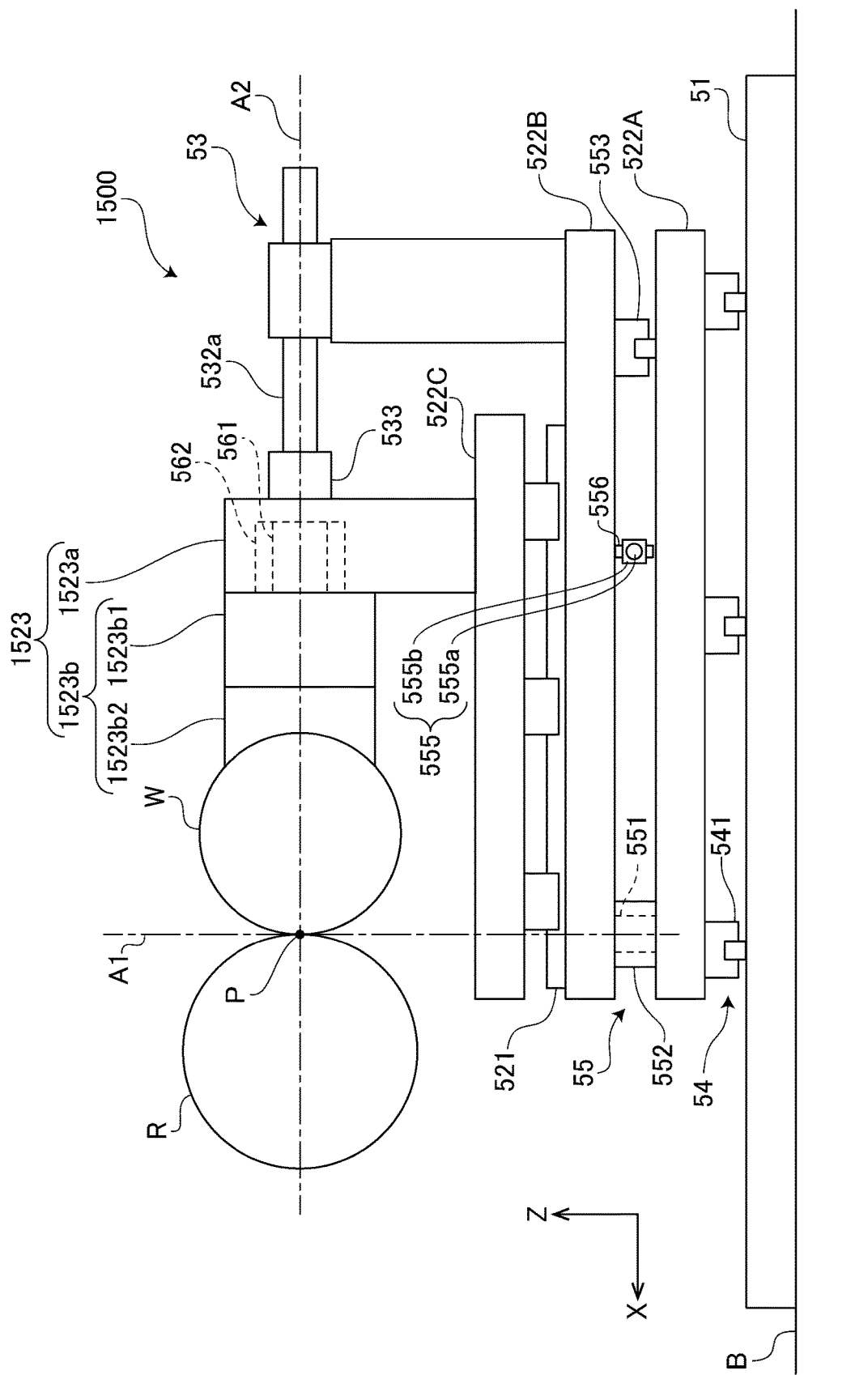
FIG. 10 is a front view showing a schematic configuration of the wheel test device shown in FIG. 9.

FIG. 9 is a plan view showing a schematic configuration of a wheel test device 1000 according to a second embodiment of the present disclosure. FIG. 10 is a front view showing a schematic configuration of the wheel test device 1000.

The wheel test device 1000 includes a wheel support 1500 in which a lateral pressure applying function, an attack angle applying function and a cant angle applying function are added to the wheel support 50 of the first embodiment.

As shown in FIG. 9, the wheel support 1500 of the wheel test device 1000 includes a lateral pressure applying mechanism 54, a cant angle applying mechanism 55, and an attack angle applying mechanism 56 in addition to the wheel load applying mechanism 53. As shown in FIG. 10, the wheel support 1500 also includes three movable bases (a first movable base 522A, a second movable base 522B, and a third movable base 522C).

The lateral pressure applying mechanism 54 is a mechanism that applies lateral pressure (thrust load) to the test wheel W. The lateral pressure includes lateral creep force (a component of adhesive force in the axial direction of the test wheel W) and flange reaction force (force caused by a contact between a flange of the test wheel W and a gauge corner of the rail wheel R), and the latter flange reaction force is applied (or adjusted to a predetermined value) by the lateral pressure applying mechanism 54.

The lateral pressure applying mechanism 54 includes a plurality of (for example, three) linear guides 541 that support the first movable base 522A with respect to the base 51 so as to be movable in the Y-axis direction, a motor 542 (FIG. 9) attached to the base B together with the fixed base 51, a motion converter 543 (FIG. 9) that converts rotational motion of the motor 542 into a linear motion in the Y-axis direction, and a lateral pressure detector 544 (FIG. 9) that detects the lateral pressure acting on the test wheel W. The linear guide 541 is a guide-way type circulating rolling bearing having the same configuration as the linear guide 521, but other types of linear guide mechanism may be used as the linear guide 541.

In the present embodiment, the lateral pressure detector 544 (a second lateral pressure detector) is used to detect the lateral pressure when the flange reaction force is applied, and the three component force sensors 529 (first lateral pressure detectors) are used to detect the lateral pressure when the flange reaction force is not applied. The wheel test device 1000 may be configured to detect the lateral pressure by using the three component force sensors 529 even when the flange reaction force is applied without providing the lateral pressure detector 544. Alternatively, the wheel test device 1000 may also be configured to detect the lateral pressure by using the lateral pressure detector 544 even when the flange reaction force is not applied. Alternatively, the wheel test device 1000 may be configured to detect static lateral pressure (mainly the flange reaction force) by using the lateral pressure detector 544 and detect dynamic lateral pressure (mainly the lateral creep force) by using the three component force sensors 529.

Although the motor 542 in the present embodiment is an AC servo motor, other types of motor capable of controlling driving amount (rotation angle), such as a DC servo motor or a stepping motor, may be used as the motor 542.

Although the motion converter 543 in the present embodiment is a feed screw mechanism such as a ball screw, other types of motion converter may be used. The screw shaft of the motion converter 543 is rotatably supported by a pair of bearings attached to the fixed base 51, and one end of the screw shaft is connected to a shaft of the motor 542. A nut (linearly moving part) of the motion converter 543 is fixed to the first movable base 522A via the lateral pressure detector 544. When the screw shaft of the motion converter 543 is rotated by the motor 542, the first movable base 522A moves in the Y-axis direction together with the nut of the motion converter 543. As a result, the test wheel W supported by the first movable base 522A also moves in the Y-axis direction, changing a position of the test wheel W in the axial direction with respect to the rail wheel R. When the test wheel W is displaced in the Y-axis direction and the flange of the test wheel W is brought into contact with the rail wheel R, a flange reaction force is applied to the test wheel W. A magnitude of the flange reaction force varies depending on the position of the test wheel W in the Y-axis direction.

As shown in FIG. 8, the motor 542 is connected to the controller 70 via a servo amplifier 542a. The lateral pressure detector 544 is connected to the measuring engine 80 via an amplifier 544a. Phase information of the shaft detected by the rotary encoder RE embedded in the motor 542 is input to the controller 70 through the servo amplifier 542a.

The measuring engine 80 measures the lateral pressure acting on the test wheel W on the basis of a signal from the lateral pressure detector 544. The controller 70 controls the driving of the motor 542 on the basis of lateral pressure setting data input through the interface 90 and the lateral pressure measurement result by the measuring engine 80 so that a set lateral pressure is applied to the test wheel W.

The cant angle applying mechanism 55 is a mechanism having a function of applying a cant angle to the test wheel W. As shown in FIG. 10, the cant angle applying mechanism 55 includes a vertically extending swing support shaft 551 attached to one of the first movable base 522A and the second movable base 522B, and a bearing 552 attached to the other of the first movable base 522A and the second movable base 522B and that rotatably supports the swing support shaft 551. The second movable base 522B is supported by the swing support shaft 551 and the bearing 552 so as to be rotatable about a rotation axis A1 of the bearing 552, which is a vertical line.

The bearing 552 is disposed substantially immediately below a contact position P at which the test wheel W contacts the rail wheel R (in the present embodiment, a right end of the rail wheel R) so that the rotation axis A1 passes through the contact position P. The rotation axis A1 is a tangent line between the rail wheel R and the test wheel W at the contact position P. Therefore, when the second movable base 522B rotates about the rotation axis A1, the test wheel W swings about the contact position P around the Z axis (in other words, the test wheel W rotates about the common tangent line between the test wheel W and the rail wheel R), and an inclination (i.e., a cant angle) about the tangent line with respect to the rail wheel R changes.

The cant angle applying mechanism 55 includes a curved guide 553 that supports the second movable base 522B at an outer peripheral portion apart from the rotation axis A1 so that the second movable base 522B can swing about the rotation axis A1 with respect to the first movable base 522A. The curved guide 553 is a guideway type circulating rolling bearing including a curved rail (guideway) and a carriage capable of running on the rail via rolling elements, but other types of curved guide mechanism may be used as the curved guide 553.

Further, the cant angle applying mechanism 55 includes a motor 554 (FIG. 9) and a motion converter 555 that converts rotational motion of the motor 554 into a linear motion in the Y-axis direction. Although the motor 554 in the present embodiment is an AC servo motor, other types of motor capable of controlling driving amount (rotation angle), such as a DC servo motor or a stepping motor, may be used as the motor 554. Although the motion converter 555 in the present embodiment is a feed screw mechanism such as a ball screw, other types of motion converter may be used.

A screw shaft 555a of the motion converter 555 is rotatably supported by a pair of bearings, and one end of the screw shaft 555a a is connected to a shaft of the motor 554. In FIG. 10, the bearings supporting the screw shaft 555a are not shown. The motor 554 and the pair of bearings of the motion converter 555 are attached to a not-shown rotary table which is rotatable about a vertical shaft provided on the first movable base 522A. The motor 554 is disposed so that the shaft thereof intersects perpendicularly with a rotation axis of the rotary table.

As shown in FIG. 10, a nut 555b (linearly moving part) of the motion converter 555 is coupled to the second movable base 522B via a hinge 556 so as to be rotatable about a vertical axis. When the screw shaft 555a is rotated by the motor 554, the hinge 556 attached to the second movable base 522B moves substantially in the Y-axis direction together with the nut 555b. Accordingly, the second movable base 522B rotates about the rotation axis A1, and the test wheel W supported by the second movable base 522B rotates about the contact position P, whereby the cant angle is changed.

As shown in FIG. 8, the motor 554 is connected to the controller 70 via a servo amplifier 554a. Phase information of the shaft detected by a rotary encoder RE embedded in the motor 554 is input to the controller 70 through the servo amplifier 554a.

The controller 70 calculates a current value of the cant angle based on a signal from the rotary encoder RE embedded in the motor 554. The controller 70 controls the driving of the motor 554 based on setting data of the cant angle inputted through the interface 90 and the current value of the cant angle so that a set cant angle is given to the test wheel W.

The attack angle applying mechanism 56 is a mechanism having a function of applying an attack angle to the test wheel W. The attack angle is an angle formed between the rail and the wheel, and more specifically, an angle about a vertical axis (i.e., an angle in the yawing direction) formed between a width direction of the rail (railroad tie direction) and the axial direction of the wheel. In the wheel test device 1000, the attack angle is defined as an angle between the rotation axis of the rail wheel R and the rotation axis of the test wheel W about the X axis.

As shown in FIG. 10, a support frame 1523 of the wheel support 1500 of the present embodiment includes a box-shaped support column 1523a fixed to the third movable base 522C, and an arm 1523b connected to the support column 1523a so as to be rotatable about a rotation axis A2 extending in the X-axis direction. Similarly to the arm 523b of the first embodiment, the arm 1523b is a substantially L-shaped member as seen from above, and includes a base part 1523b1 extending in the Y-axis direction and connected to an upper portion of the support column 1523a, and a trunk part 1523b2 extending to the left from a rear end portion of the base part 1523b1.

From a right end of the base part 1523b1, a swing support shaft 561 protrudes in the X-axis direction. A bearing 562 that rotatably support the swing support shaft 561 is attached to an upper portion of the support column 1523a. The arm 1523b is supported by the bearing 562 via the swing support shaft 561 so as to be rotatable about the rotation axis A2 extending in the X-axis direction. The bearing 562 is disposed such that the rotation axis A2 passes through the contact position P. That is, the rotation axis A2 is a straight line perpendicularly passing through the tread surface of the test wheel W. The swing support shaft 561 and the bearing 562 form a part of the attack angle applying mechanism 56.

As shown in FIG. 9, the attack angle applying mechanism 56 includes a motor 564, and a motion converter 563 that converts rotational motion of the motor 564 into a linear motion in the Z-axis direction. Although the motor 564 in the present embodiment is an AC servo motor, other types of motor capable of controlling driving amount (rotation angle), such as a DC servo motor or a stepping motor, may be used as the motor 564. Although the motion converter 563 in the present embodiment is a feed screw mechanism such as a ball screw, other types of motion converter may be used.

The screw shaft of the motion converter 563 is rotatably supported by a pair of bearings, and one end of the screw shaft is connected to a shaft of the motor 564 via a bevel gear. The screw shaft of the motion converter 563 may be directly connected to the shaft of the motor 564. The motor 564 and the motion converter 563 are attached to a swing frame coupled to the third movable base 522C via a hinge having a rotation shaft extending in the X-axis direction so as to be rotatable (i.e., swingable) within a predetermined angular range about the rotation shaft of the hinge.

A nut (linearly moving part) of the motion converter 563 is coupled to the arm 1523b of the support frame 1523 via a hinge having a rotation shaft extending in the X-axis direction so as to be swingable about the rotation shaft of the hinge. When the screw shaft of the motion converter 563 is rotated by the motor 564, the hinge attached to the arm 1523*b* moves together with the nut substantially in the Z-axis direction. Accordingly, the test wheel W supported by the arm 1523*b* together with the arm 1523*b* rotates about the rotation axis A2 passing through the contact position P (in other words, a straight line perpendicular to the tread surface of the test wheel), whereby an attack angle is given.

As shown in FIG. 8, the motor 564 is connected to the controller 70 via a servo amplifier 564*a*. Phase information of the shaft detected by a rotary encoder RE embedded in the motor 564 is input to the controller 70 through the servo amplifier 564*a*.

The controller 70 calculates the current value of the attack angle based on the signal of the rotary encoder RE embedded in the motor 564. The controller 70 controls the driving of the motor 564 based on setting data of the attack angle input through the interface 90 and the current value of the attack angle so that a set attack angle is given to the test wheel W.

As shown in FIG. 10, the linearly moving part 532*a* of the motion converter 532 of the wheel load applying mechanism 53 is fixed to the support column 1523*a* of the support frame 1523 via the wheel load detector 533. The linearly moving part 532*a* of the motion converter 532 is disposed so that the center line thereof coincides with the rotation axis A2. This prevents a large moment of force from being applied to the support frame 1523 when the wheel load is applied.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the above-described embodiment, the wheel load applying mechanism 53 is provided on the wheel support 50 and is configured to adjust the wheel load by moving the test wheel W back and forth with respect to the rail wheel R. However, for example, the wheel load applying mechanism may be provided to the rail wheel support and the wheel load may be adjusted by moving the rail wheel R back and forth with respect to the test wheel W.

In the above-described embodiment, the rail wheel R is connected to the rotary driver 10 without the torque generator 20 therebetween, and the test wheel W is connected to the rotary driver 10 via the torque generator 20. However, for example, the rail wheel R may be connected to the rotary driver 10 via the torque generator 20, and the test wheel W may be connected to the rotary driver 10 without the torque generator 20 therebetween. Alternatively, two torque generators 20 may be provided, and the rail wheel R may be connected to the rotary driver 10 via one torque generator 20, and the test wheel W may be connected to the rotary driver 10 through another torque generator 20.

In the above-described embodiment, a plurality of three component force sensors are provided to the wheel support 50, and the measuring engine 80 measures the torque and wheel load acting on the test wheel W based on the detection results of the plurality of three component force sensors. However, for example, the torque and wheel load may be measured based on detection results of a plurality of two component force sensors or one component force sensors.

In the above-described embodiment, the function of the power distributor is incorporated in the rail wheel support 32, but the power distributor may be separated from the rail wheel support 32. For example, the first transmission section 30 may not be connected to the rail wheel support 32, and the rotary driver 10 and the first transmission section 30 may be connected via additional power transmitter (e.g., winding transmission or gear transmission). In this case, the drive pulley 311 of the first belt mechanism 31 and the shaft of the rotary driver 10 to which a pulley or gear of the additional power transmitter is to be mounted function as the power distributor.

In the second embodiment described above, the fixed base 51 and the spindle 527 are coupled to each other via the lateral pressure applying mechanism 54, the cant angle applying mechanism 55, the wheel load applying mechanism 53, and the attack angle applying mechanism 56 in this order. However, the lateral pressure applying mechanism 54, the cant angle applying mechanism 55, the wheel load applying mechanism 53, and the attack angle applying mechanism 56 may be connected in any order.

What is claimed is:

1. A wheel test device comprising:
    a rail wheel support configured to rotatably support a rail wheel;
    a wheel support configured to rotatably support a test wheel in a state where the test wheel is in contact with the rail wheel;
    a first electric motor configured to rotate the rail wheel and the test wheel;
    a power distributor configured to distribute power generated by the first electric motor to the rail wheel and the test wheel; and
    a torque generator configured to generate torque to be applied to the test wheel,
    wherein the torque generator includes:
       a rotating frame rotationally driven by the first electric motor; and
       a second electric motor mounted on the rotating frame,
    wherein the rail wheel, the test wheel, or both the rail wheel and the test wheel is connected to the first electric motor via the torque generator,
    wherein the rail wheel and the test wheel are configured to rotate in opposite directions at substantially the same peripheral speed when the operation of the second electric motor is stopped, and
    wherein a rated output of the second electric motor is equal to or more than 3 kW, and moment of inertia of a rotating part of the second electric motor is equal to or less than 0.01 kg·m$^2$.

2. The wheel test device according to claim 1, wherein the torque generator includes an output shaft disposed coaxially with the rotating frame.

3. The wheel test device according to claim 2, wherein:
the torque generator includes a bearing unit configured to rotatably support the rotating frame;
the rotating frame has a cylindrical shaft part supported by the bearing unit;
a bearing is provided on an inner periphery of the shaft part; and
the output shaft passes through a hollow portion of the shaft part and is rotatably supported by the bearing.

4. The wheel test device according to claim 1, wherein the second electric motor is disposed coaxially with the rotating frame.

5. The wheel test device according to claim 1, wherein the second electric motor is fixed to the rotating frame via a plurality of rod-shaped connecting members arranged radially about a rotation axis of the rotating frame.

6. The wheel test device according to claim 1, wherein the rotating frame includes a cylindrical motor housing part configured to house the second electric motor.

7. The wheel test device according to claim 1, further comprising:
a controller configured to control the first electric motor and the second electric motor;
a rotation speed measuring unit configured to measure a rotation speed of the rail wheel; and
a torque measuring unit configured to measure the torque of the test wheel,
wherein the controller:
controls driving of the first electric motor based on measurement result of the rotation speed measuring unit; and
controls driving of the second electric motor based on measurement result of the torque measuring unit.

8. The wheel test device according to claim 1, comprising a wheel load applying mechanism configured to apply a wheel load to the test wheel by moving one of the test wheel and the rail wheel forward and backward with respect to the other.

9. The wheel test device according to claim 1, comprising an attack angle applying mechanism configured to apply an attack angle by rotating one of the test wheel and the rail wheel about a straight line perpendicular to a tread surface of the test wheel with respect to the other.

10. The wheel test device according to claim 1, comprising a cant angle applying mechanism configured to apply a cant angle by rotating one of the test wheel and the rail wheel about a tangent line with respect to the other.

11. The wheel test device according to claim 10, comprising a lateral pressure applying mechanism configured to apply lateral pressure to the test wheel by moving one of the test wheel and the rail wheel in an axial direction with respect to the other.

* * * * *